United States Patent
Hindi et al.

(10) Patent No.: US 11,141,705 B1
(45) Date of Patent: Oct. 12, 2021

(54) FENTON APPARATUS FOR SAFETY OF INDUSTRIAL EXOTHERMIC REACTIONS

(71) Applicant: King Abdulaziz University, Jeddah (SA)

(72) Inventors: Sherif Shawki Zaki Hindi, Jeddah (SA); Uthman Mohammed Ahmed Dawoud, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/208,576

(22) Filed: Mar. 22, 2021

(51) Int. Cl.
*B01J 19/00* (2006.01)
*B01F 15/06* (2006.01)
*B01F 3/04* (2006.01)

(52) U.S. Cl.
CPC ........ *B01F 15/066* (2013.01); *B01F 3/04836* (2013.01); *B01J 19/0013* (2013.01); *B01J 2219/00083* (2013.01); *B01J 2219/00094* (2013.01)

(58) Field of Classification Search
CPC . B01F 15/066; B01F 3/04836; B01J 19/0013; B01J 2219/00083; B01J 2219/00094
USPC ........................................................ 366/144
See application file for complete search history.

(56) References Cited

U.S. PATENT DOCUMENTS

| 2,875,027 A | 2/1959 | Dye |
| 2004/0004717 A1* | 1/2004 | Reed ...................... G01N 15/14 356/338 |

FOREIGN PATENT DOCUMENTS

| CN | 102681565 A | 9/2012 |
| CN | 206027694 U | 3/2017 |
| CN | 108059300 A | 5/2018 |

* cited by examiner

*Primary Examiner* — Huy Tram Nguyen
(74) *Attorney, Agent, or Firm* — Oblon, McClelland, Maier & Neustadt, L.L.P.

(57) ABSTRACT

A Fenton apparatus of the present disclosure includes a reactor vessel, gas injection inlets that allow ejection of aeration coolant perpendicular to axis of the reactor vessel to agitate a reaction composition present in the reactor vessel under vortex conditions, a jacket cooling loop encasing the reactor vessel to allow circulation of a jacket coolant selected from a group consisting of forced air, nitrogen gas, and water, a coil cooling loop coiling around the reactor vessel to allow circulation of a coil coolant selected from a group consisting of forced air, nitrogen gas, water, and carbon dioxide. Multiple programmable solenoid valves are provided to individually control injection of the aeration coolant, the jacket coolant, and the coil coolant. A controller is provided to communicate with a temperature sensor and each programmable solenoid valve.

20 Claims, 17 Drawing Sheets

FENTON APPARATUS FOR SAFETY OF INDUSTRIAL EXOTHERMIC REACTIONS

BACKGROUND

Field of the Invention

The present disclosure is related to methods and systems for controlling exothermic reactions and, more particularly, to a Fenton apparatus for improved safety of industrial exothermic reactions.

Discussion of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Typically, exothermic reactions produce excessive heat which may be capable of creating hazardous incidents, such as explosion with risk of injury to people in proximity of the exothermic reaction, when not controlled. In cases where the exothermic reaction occurs within a reactor, generation of such excessive heat may result in rapid rise of temperature of contents within the reactor and over-pressurization of the contents due to violent boiling or uncontrolled gas generation. Such rise in temperature may initiate secondary risks and or decomposition of the contents within the reactor. Additionally, the over-pressurization of the contents may result in catastrophic failure of an energy plant implementing the reactor and may further lead to a blast or damage of portions of the energy plant.

Such problems may occur due to inadequate understanding of thermodynamics of an exothermic chemical process, inadequate design for heat removal from the reactor, inadequate systems to control the generated heat and address safety of surroudings, inadequate operational procedures including training of labors, and increase in volume of reaction precursors against surface area available to remove the generated heat from chemical reaction of the reaction precursors in the reactor.

Solutions known to control the exothermic reactions by controlling internal operational conditions, especially temperature and pressure include mechanical stirring of the contents of the reactor, fail to address the problems described hereinabove.

SUMMARY

In an exemplary embodiment, a mixed Fenton apparatus is described. The mixed Fenton apparatus includes a reactor vessel comprising stainless steel, gas injection inlets centrally located within the reactor vessel, a jacket cooling loop encasing the reactor vessel, and a coil cooling loop coiling around the reactor vessel. The gas injection inlets include a direction end that permits ejection of gas perpendicular to the axis of the reactor vessel to thereby agitate a reaction composition present in the reactor vessel under vortex conditions. The mixed Fenton apparatus further includes at least one aeration coolant injected through the gas injection inlets, at least one jacket coolant circulating through the jacket cooling loop, and at least one coil coolant circulating through the coil cooling loop. According to an aspect of the present disclosure, the at least one aeration coolant is selected from the group consisting of forced air, nitrogen gas, and carbon dioxide gas. The at least one jacket coolant is selected from the group including of forced air, nitrogen gas, and/or water. The at least one coil coolant is selected from the group consisting of forced air, nitrogen gas, water, and carbon dioxide gas. The mixed Fenton apparatus further includes a temperature sensor positioned within the reactor vessel, and a plurality of programmable solenoid valves that individually control the injection of the aeration coolant, circulation of jacket coolant, and coil coolant. A controller of the mixed Fenton apparatus is configured to communicate with the temperature sensor and each of the plurality of programmable solenoid valves.

In another exemplary embodiment, a mixed Fenton apparatus is described. The mixed Fenton apparatus includes a reactor vessel comprising stainless steel and gas injection inlets centrally located within the reactor vessel. The gas injection inlets have a direction end that permits ejection of gas perpendicular to the axis of the reactor vessel and are configured to permit circular flow of gas in a vortex a jacket cooling loop encasing the reactor vessel. The mixed Fenton apparatus further includes at least aeration one coolant selected from the group consisting of forced air, nitrogen gas, and carbon dioxide gas injected through the gas injection inlets, and an exothermic reaction fluid circulating through the jacket cooling loop.

In another exemplary embodiment, an individual Fenton apparatus is described. The individual Fenton apparatus includes a reactor vessel comprising stainless steel, a jacket cooling loop encasing the reactor vessel and an exothermic reaction fluid circulating through the jacket cooling loop.

The foregoing general description of the illustrative aspect of the present disclosures and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
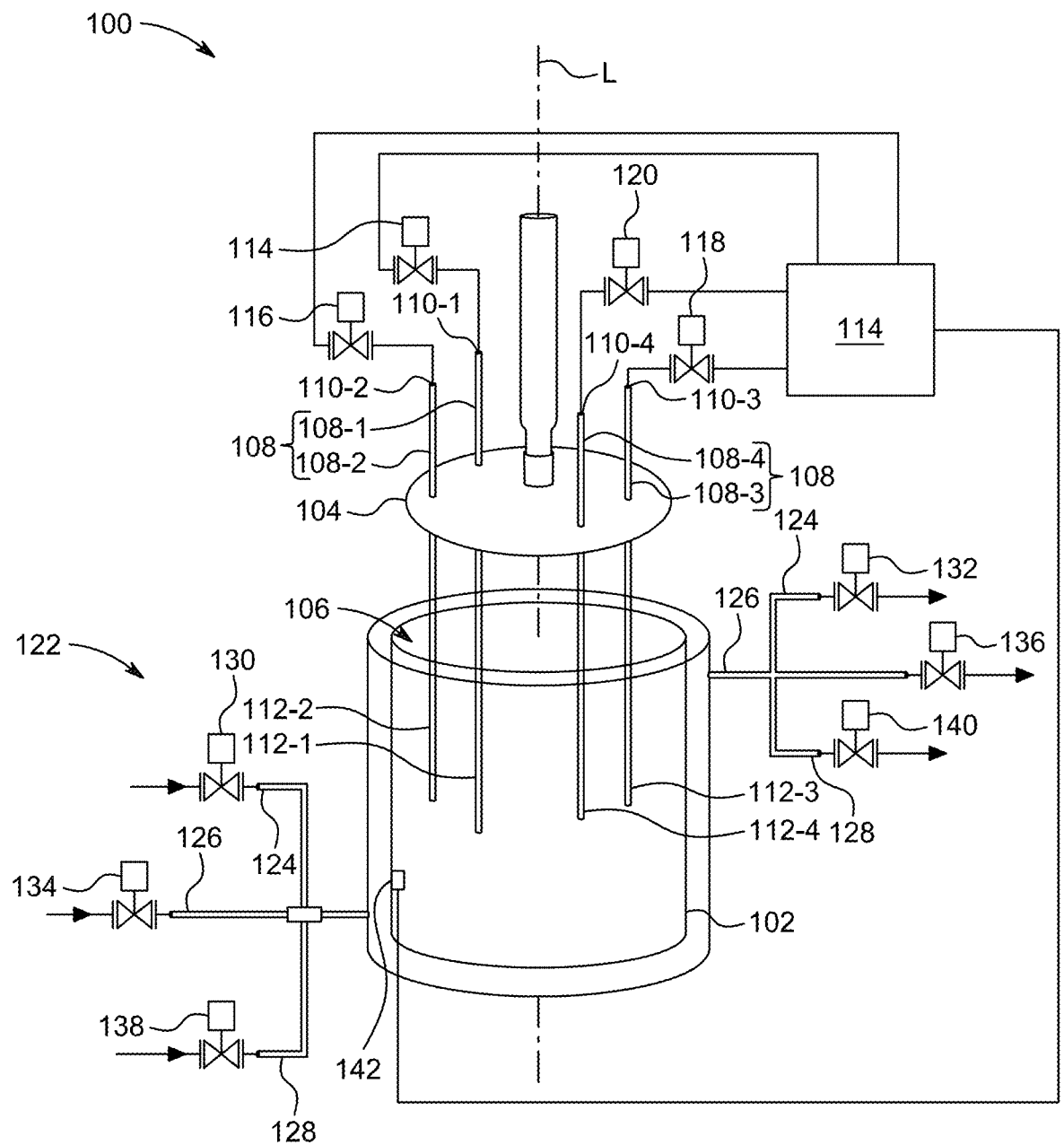
FIG. 1 is a schematic diagram of a mixed Fenton apparatus, according to an embodiment of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present disclosure are directed to a mixed Fenton apparatus and an individual Fenton apparatus which uses exothermic heat generated from a Fenton reagent to aid multiple chemical processes, such as elimination of lignin from lignocellulosic materials to produce products, for example, but not limited to, alpha cellulose (α-cellulose) and synthesis of microcrystalline cellulose (MCC), nanocrystalline cellulose (NCC), and cellulose nanofibrils (CNF).

Referring to FIG. 1, a schematic diagram of a mixed Fenton apparatus 100 (hereinafter referred to as "the Fenton apparatus 100") is illustrated. According to exemplary aspects of the present disclosure, the Fenton apparatus 100 includes a reactor vessel 102 embodied as a hollow cylindrical structure extending along a longitudinal axis 1' thereof and a cover plate 104 configured to cover an open end 106 of the reactor vessel 102. In an embodiment, the reactor vessel 102 is manufactured from stainless steel, particularly, stainless steel type SS316L. The stainless steel SS316L is a low carbon version of 316 steel alloy, which aids in reducing harmful carbide precipitation during welding process performed on the reactor vessel 102. Additionally, SS316L is known as austenitic Chromium-Nickel stainless steel which exhibits properties of high corrosion resistance and high thermal conductivity (k=16 W/mK). The stainless steel also functions as electron donor to support oxidation of Fenton reagent. Preferably, the reactor vessel 102 is embodied as a double-walled stainless steel structure.

The Fenton apparatus 100 further includes multiple gas injection inlets 108 that are centrally located within the reactor vessel 102 and directed into the reactor vessel 102 through the cover plate 104. Specifically, the gas injection inlets 108 include a first pipe 108-1 having a first end 110-1 and a second end 112-1, a second pipe 108-2 having a first end 110-2 and a second end 112-2, a third pipe 108-3 having a first end 110-3 and a second end 112-3, and a fourth pipe 108-4 having a first end 110-4 and a second end 112-4. The first ends of the gas injection inlets 108 are coupled to a first set of programmable solenoid valves. As illustrated in FIG. 1, the first end 110-1 of the first pipe 108-1 is coupled to a first solenoid valve 114, the first end 110-2 of the second pipe 108-2 is coupled to a second solenoid valve 116, the first end 110-3 of the third pipe 108-2 is coupled to a third solenoid valve 118, and the first end 110-4 of the fourth pipe 108-4 is coupled to a fourth solenoid valve 120. The first solenoid valve 114, the second solenoid valve 116, the third solenoid valve 118, and the fourth solenoid valve 120 together constitutes the first set of programmable solenoid valves. In an embodiment, the first set of programmable solenoid valves is configured to control injection of at least one aeration coolant through respective pipes of the gas injection inlets 108. The at least one aeration coolant is selected from the group consisting of forced air, nitrogen gas, and carbon-dioxide gas. In an embodiment, the Fenton apparatus 100 may include gas regulator system (not shown) having a regulator and a flowmeter to achieve desired flow rate of the gas The gas flow rate is the amount of gas that flows through the gas inject inlets 106 per minute. By way of example, the gas flow rate may be a range between 300 mL/minute-850 mL/minute. Further the gas flow rate may be maintained at 354 mL/minute until a steady gas flow is achieved through the gas injection inlets 108 and the flow rate of the gas may then be increased to 825 mL/minute. Additionally, in some embodiments, pressure gauges (not shown) may be deployed to measure pressure of the gas supplied through the gas injection inlets 108. According to some aspects, flow co-efficient of the aeration coolant may be about 14 with a pressure drop of about 1 psi across respective solenoid valves.

The Fenton apparatus 100 further includes a jacket cooling loop 122 encasing the reactor vessel 100. In an embodiment, the jacket cooling loop 122 is embodied as a three-way connector loop coupled to a second set of programmable solenoid valves. The jacket cooling loop 116 includes a first jacket cooling subloop 124, a second jacket cooling subloop 126, and a third jacket cooling subloop 128. In an embodiment, a fifth solenoid valve 130 is coupled to an inlet of the first jacket cooling subloop 124 and a sixth solenoid valve 132 is coupled to an outlet of the first jacket cooling subloop 124. Similarly, a seventh solenoid valve 134 is coupled to an inlet of the second jacket cooling subloop 126 and an eighth solenoid valve 136 is coupled to an outlet of the second jacket cooling subloop 126. A ninth solenoid valve 138 is coupled to an inlet of the third jacket cooling subloop 128 and a tenth solenoid valve 140 is coupled to an outlet of the third jacket cooling subloop 128. These solenoid valves 130-140 of the jacket cooling loop 122 constitute the second set of programmable solenoid valves.

The jacket cooling loop 122 is configured to allow flow of at least one jacket coolant there through. In an implementation, the at least one jacket coolant is selected from a group consisting of a first coolant, a second coolant, and a third coolant. In an embodiment, the first jacket cooling subloop 124 may be configured to allow circulation of the first coolant, by way of example, the first coolant is water. In an embodiment the second jacket cooling subloop 126 may be configured to allow circulation of the second coolant, by way of example, the second coolant is nitrogen gas. In an embodiment, the third jacket cooling subloop 128 may be configured to allow circulation of the third coolant, by way of example, the third coolant is forced air. The order of the jacket coolant described herein should not be treated as limited. In another embodiment, the at least one jacket coolant may be circulated through the subloops in a predetermined sequence and in a predetermined order. The second set of programmable solenoid valves is configured to control the circulation of the at least one jacket coolant through the respective subloops.

The Fenton apparatus 100 further includes a temperature sensor 142 positioned within the reactor vessel 102 to sense temperature of contents thereof. In one example, the temperature sensor 142 may be embodied as digital thermocouple, such as a chromel-alumel thermocouple. In some embodiments, the Fenton apparatus 100 may include multiple temperature sensors disposed at various heights of the reactor vessel 102 to sense corresponding temperature of the contents thereof.

Figure 3:
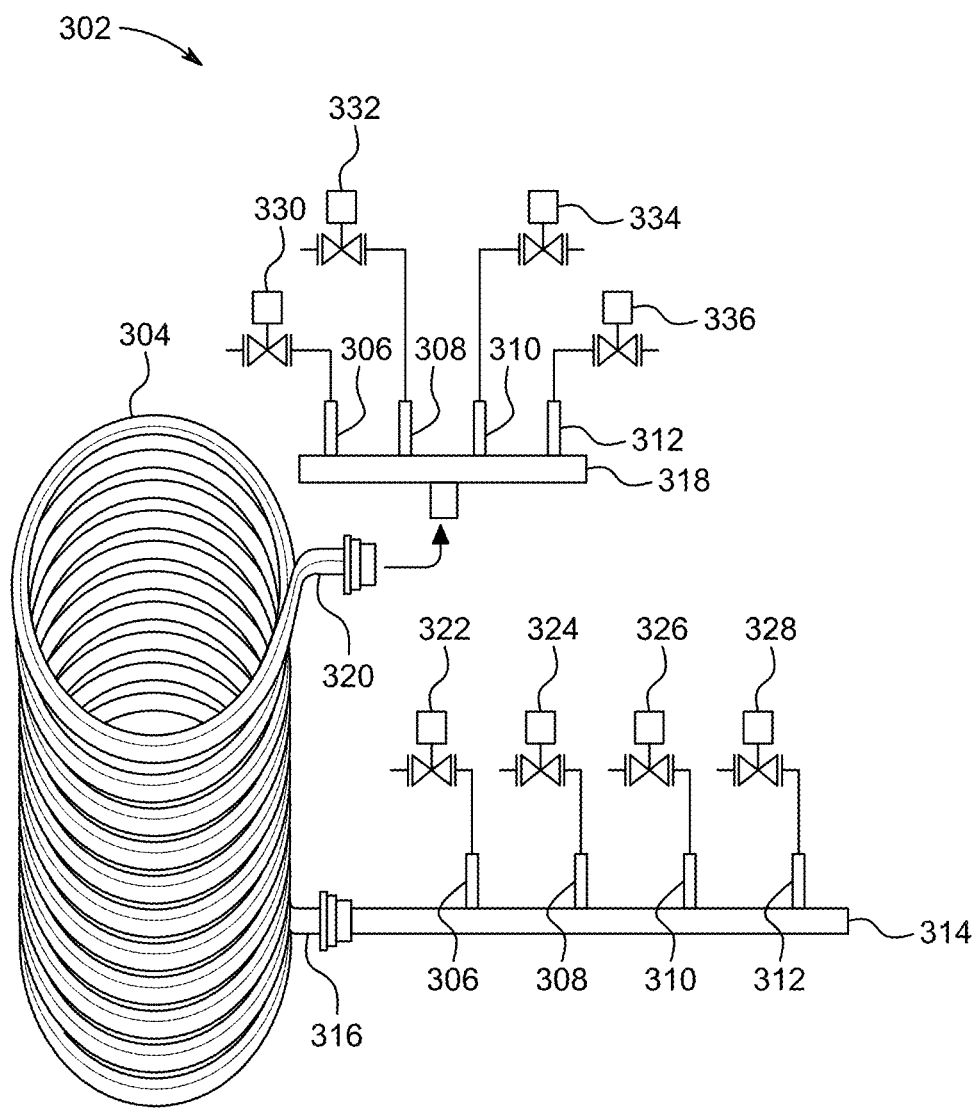
FIG. 3 is a schematic diagram of a coil cooling loop of the mixed Fenton apparatus of FIG. 1, an embodiment of the present disclosure.

In an embodiment, the Fenton apparatus 100 further includes a controller 144 configured to communicate with the temperature sensor 142, the first set of programmable solenoid valves including the first solenoid valve 114, the second solenoid valve 116, the third solenoid valve 118, and the fourth solenoid valve 120, the second set of programmable solenoid valves including the solenoid valves 130-140 of the jacket cooling loop 122 and a third set of programmable solenoid valves including the eleventh solenoid valve 322 to the eighteenth solenoid valve 336 (described with respect to FIG. 3).

Figure 2:
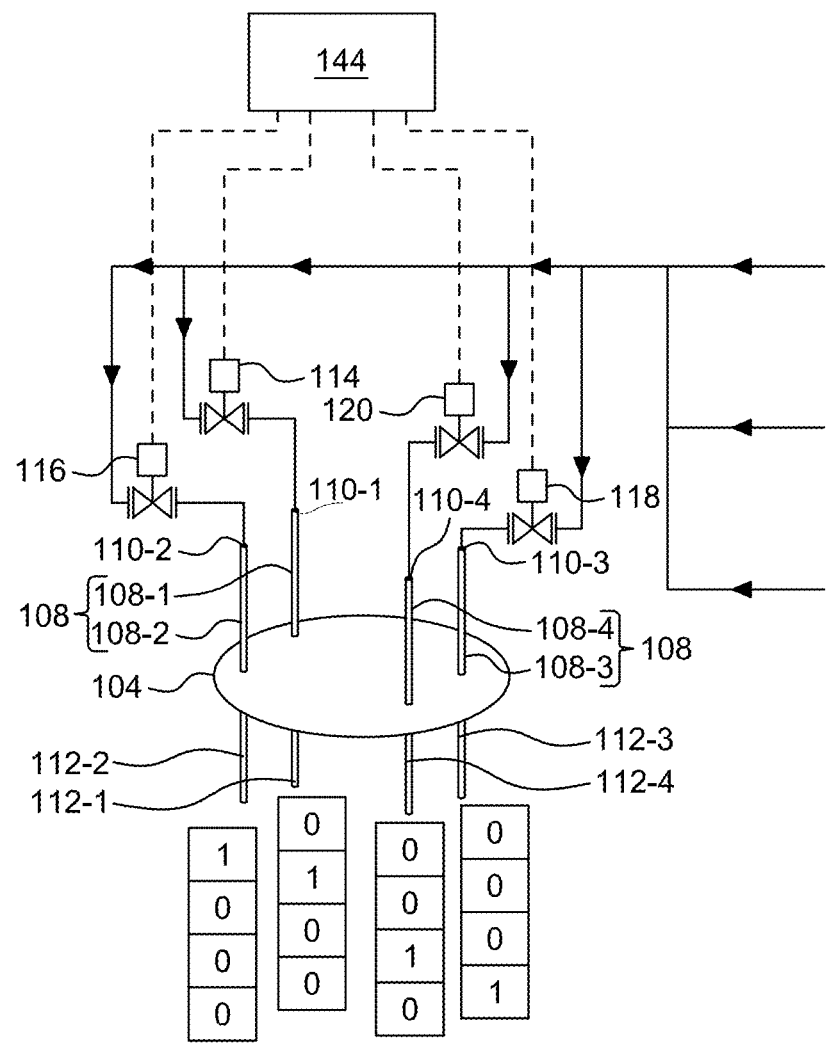
FIG. 2 is a schematic diagram of gas injection inlets of the mixed Fenton apparatus of FIG. 1, according to an embodiment of the present disclosure.

FIG. 2 is a schematic diagram of the gas injection inlets 108 of the Fenton apparatus 100. In an embodiment, the second ends of the gas injection inlets 108 are disposed at a predetermined distance from a bottom portion of the reactor vessel 102. Additionally, the second end of each of the first pipe 108-1, second pipe 108-2, third pipe 108-3, and fourth pipe 108-4 associated with the gas injection inlets 108 are configured to allow ejection of gas into the reactor vessel 102 in a direction perpendicular to the longitudinal axis "L" of the reactor vessel 102. For example, the second end of each of the first pipe 108-1, second pipe 108-2, third pipe 108-3, and fourth pipe 108-4 may define openings (not shown) oriented in the direction perpendicular to the longitudinal axis "L" of the reactor vessel 102. As such, the ejection of the gas from the pipes causes agitation of the contents therein. In an embodiment, the first end 110-1 of the first pipe 108-1, the first end 110-2 of the second pipe 108-2, the first end of 110-3 of the third pipe 108-3, and the first end 110-4 of the fourth pipe 108-4 has a circular shaped hole that is configured to allow gas to enter and exit through to the gas injection inlets 108. In this embodiment, these holes are circular shaped with a diameter of 0.5 inches. In an embodiment, the diameter of the circular shaped holes may be any value in the range of 0.1-1.0 inches. In another embodiment, the diameter of the circular shaped holes may be any value in the range of 1-50 millimeters (mm), however any other shape of the hole may also be included. In an embodiment, the first ends 110-1, 110-2, 110-3, and 110-4 are placed above the circular cover plate 104 at a distance of about one-third of its radius towards its circumference. In addition, these holes are inserted at a imagined circle, whereby they divide the circumference of the circular cover plate 104 equally. Further, the cover plate 104 is a gas tight sealed cover, which encloses the reactor vessel 102, such that the gases do not leak out of the reactor vessel 102. In an embodiment, first ends 110-1 and 110-4 are placed diagonally opposite to each other and first ends 110-2 and 110-3 are placed diagonally opposite to each other. The first ends 110-1 and 110-2 placed closer to each other and away from the first ends 110-3 and 110-4. The first ends 110-3 and 110-4 are placed closer to each other and away from the first ends 110-1 and 110-2. In an embodiment, first ends 110-1, 110-2, 110-3, and 110-4 may include adjustable ejection ports covered with electrical flaps that allow injection of gas when the flaps are opened and block the flow of gas when the flaps are closed. The electrical flaps may be programmed to open and close based on predefined software instructions. In an embodiment, the electrical flaps may be controlled remotely over wired or wireless connection.

The openings in the first ends 110-1 and 110-4 are preferably spaced and arranged in a manner to improve agitation and mixing inside the reactor vessel. Further, each of the first pipe 108-1, second pipe 108-2, third pipe 108-3 and fourth pipe 108-4 extends from the top of the reaction vessel to a distance near the bottom of the reaction vessel. In this respect the distance from the top of the reaction vessel to the end of the pipes may represent $9/10$, $8/10$, $7/10$, $6/10$, or $5/10$ of the total distance from the top the reaction vessel to the bottom reaction vessel. Each of the first pipe 108-1, second pipe 108-2, third pipe 108-3 and fourth pipe 108-4 may have a single gas injection hole or multiple gas injection holes. In an embodiment, in which multiple gas injection holes are present on each of the pipes 108-1, 108-2, 108-3, and 108-4, all of the pipes have the same number of injection holes, and the injection holes are evenly spaced along the length of the pipes 108-1, 108-2, 108-3, and 108-4. For example, there may be one, two, three or four injection holes per $1/10$ distance of the length of the pipes 108-1, 108-2, 108-3, and 108-4 from the top of the reaction vessel to the bottom of the objection. Further, the injection holes associated with each of the pipes 108-1, 108-2, 108-3, and 108-4 including the openings at the first ends 110-1 and 110-4 and injection holes that are evenly spaced along the length of the pipes 108-1, 108-2, 108-3, and 108-4 are preferably oriented tangentially to the circumference of the reaction vessel such that all the holes in all of the pipes 108-1, 108-2, 108-3, and 108-4 are oriented clockwise or counterclockwise with respect to a circular path defined by the circumference of the reaction vessel. Further preferably, the injection holes are preferably not coplanar at a particular level within the reaction vessel but instead form a consecutive, corkscrew type advancement of injection holes. For example, each of the pipes having holes at a bottom position, and a first pipe may have a hole at a distance of $9/10$ from the bottom of the reaction vessel. The second pipe may have a hole at a distance of 9.25/10 from the bottom of the reaction vessel, the third pipe may have a corresponding hole at a distance of 9.5/10 from the bottom of the reaction vessel, and the fourth pipe may have a hole at a distance of 9.75/10 from the bottom of the reaction vessel.

In still a further embodiment, each of the injection pipes 108-1, 108-2, 108-3, and 108-4 has a single has an injection point that is adjustable. The gas injection point has a ball and socket configuration permitting manual readjustment of the gas injection direction independently for each of the gas injection pipes 108-1, 108-2, 108-3, and 108-4.

In an embodiment, the controller 144 may be configured to inject the at least one aeration coolant through at least one of the first pipe 108-1, the second pipe 108-2, the third pipe 108-3, and the fourth pipe 108-4. For example, each of the first set of programmable solenoid valves including the first solenoid valve 114, the second solenoid valve 116, the third solenoid valve 118 may be actuated by the controller 144 in a predetermined sequence, where the controller 144 is configured to supply electric current to each solenoid valve for actuation. As depicted in FIG. 2, when the first solenoid valve 114 is actuated (indicated by "1"), the other three solenoid valves are not actuated (indicated by "0"). As such, the aeration coolant is allowed to flow through the first pipe 108-1 into the reactor vessel 102 for a predetermined time. Subsequently, when the second solenoid valve 116 is actuated (indicated by "1"), the remaining three solenoid valves are not actuated (indicated by "0"), thereby allowing the aeration coolant to flow through the second pipe 108-2. In one implementation, time duration between end of injection of the aeration coolant through the first pipe 108-1 and start of injection of the aeration coolant through the second pipe 108-2 may be substantially low. In another implementation, a predefined overlap may occur with respect to injection of the aeration coolant through the first pipe 108-1 and the second pipe 108-2.

Similarly, when the controller 144 controls the actuation of each of the solenoid valves including the first solenoid valve 114, the second solenoid valve 116, the third solenoid valve 118, the solenoid valves 130-140 of the jacket cooling loop 122 and the eleventh solenoid valve 322 to the eighteenth solenoid valve 336 in the predetermined sequence, helical streams of the aeration coolant may be injected into the contents of the reactor vessel 102 in the direction perpendicular to the longitudinal axis "L", thereby reducing the pressure at the center along the longitudinal axis "L" resulting in a vortex in the reactor vessel 102. Such vortex may allow stirring of the contents in the reactor vessel 102, thereby saving energy and simplifying design of the reactor vessel 102 without the need for mechanical agitation with a conventional mechanical stirring apparatus. In an embodiment, based on predefined parameters, the controller 144 may be configured to select the aeration coolant for injecting into the reactor vessel 102. For example, the predefined parameters may include, but not limited to, temperature of the reactor vessel 102 and enthalpy of the contents therein.

FIG. 3 illustrates a schematic diagram of a coil cooling loop 302 of the Fenton apparatus 100. In an embodiment, the coil cooling loop 302 includes a coil tube 304 configured to coil around the reactor vessel 102. In an example, diameter of the coil tube 304 may be 0.25 inches. At least one coil coolant selected from a group consisting of forced air, nitrogen gas, water, and carbon dioxide gas is allowed to circulate through the coil cooling loop 302.

In an embodiment, the coil cooling loop 302 includes a first coil cooling subloop 306, a second coil cooling subloop 308, a third coil cooling subloop 310, and a fourth coil cooling subloop 312. A third set of programmable solenoid valves including the solenoid valves 130-140 are coupled to ends of each of the coil cooling subloop 302 including a first coil cooling subloop 306, a second coil cooling subloop 308, a third coil cooling subloop 310, and a fourth coil cooling subloop 312. Further, a first common rail 314 is coupled to an inlet 316 of the coil tube 304 and a second common rail 318 is coupled to an outlet 320 of the coil tube 304. In an embodiment, inlet solenoid valves, such as an eleventh solenoid valve 322, twelfth solenoid valve 324, thirteenth solenoid valve 326, and fourteenth solenoid valve 328 are coupled to the first common rail 314. Similarly, outlet solenoid valves, such as a fifteenth solenoid valve 330, sixteenth solenoid valve 332, seventeenth solenoid valve 334, and eighteenth solenoid valve 336 are coupled to the second common rail 318. To this end, the Fenton apparatus 100 uses eighteen solenoid valves configured to allow supply and circulation of coolant into and around the reactor vessel 102, respectively.

The first coil cooling subloop 306 extends between the eleventh solenoid valve 322 and the fifteenth solenoid valve 330 and may be configured to allow flow of forced gas, such as compressed air, there through. The second coil cooling subloop 308 extends between the twelfth solenoid valve 324 and the sixteenth solenoid valve 332 and may be configured to allow flow of carbon-dioxide gas there through. The third coil cooling subloop 310 extends between the thirteenth solenoid valve 326 and the seventeenth solenoid valve 334 and may be configured to allow flow of nitrogen gas there through. The fourth coil cooling subloop 312 extends between the fourteenth solenoid valve 328 and the eighteenth solenoid valve 336 and may be configured to allow flow of water therethrough. In an embodiment, with the aid of controller 144, each of the inlet solenoid valves including the eleventh solenoid valve 322, the twelfth solenoid valve 324, the thirteenth solenoid valve 326, and the fourteenth solenoid valve 328 are configured to control injection of the coil coolant through respective coil cooling subloop. The eleventh solenoid valve 322 to the eighteenth solenoid valve 336 constitute the third set of programmable solenoid valves.

During operation of the Fenton apparatus 100, product precursors and Fenton reagent may be added to the reactor vessel 102. The Fenton reagent includes a mixture of hydrogen peroxide, ferric sulphate, and citric acid, which functions as an exothermic reagent. The exothermic heat generated by the Fenton reagent is sufficient to aid the reaction between the product precursors in the reactor vessel 102. The temperature sensor 142 continuously senses temperature of the contents of the reactor vessel 102 and thus the controller 144 may continuously monitor the temperature of the reactor vessel 102. Besides controlling the injection of the at least on aeration coolant into the reactor vessel 102, the controller 144 may be further configured to operate the second set of programmable solenoid valves and the third set of programmable solenoid valves to control the temperature of the reactor vessel 102 and therefore control the exothermic heat generated in the reactor vessel 102. In an embodiment, the gas injection inlets 108 are coupled to an automated working system 146 configured to create a vortex within the exothermic reaction fluid, for example the contents of the reactor vessel 102, by controlling the circulating of the aeration coolant. In another embodiment, based on the input from the temperature sensor 142, hot water may be supplied through the coil tube 304 via one of the solenoid valves of the third set of programmable solenoid valves to increase the temperature of the contents of the reactor vessel 102.

In some embodiments, the automated working system 146 may be implemented as a module in the controller 144. As used herein, the term "module" may, amongst other things, include routines, programs, objects, components, data structures, etc., which perform particular tasks or implement particular data types. The module may also be implemented as, signal processor(s), state machine(s), logic circuitries, and/or any other device or component that manipulate signals based on operational instructions. Further, the controller 144 may be provided through use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included. In some aspects of the present disclosure, the controller 144 may include a memory (not shown) coupled to the processor and may include any computer-readable medium known in the art including, for example, volatile memory, such as Static Random Access Memory (SRAM) and Dynamic Random Access Memory (DRAM), and/or non-volatile memory, such as Read Only Memory (ROM), Erasable Programmable ROMs (EPROMs), flash memories, hard disks, optical disks, and magnetic tapes, to store the operational instructions.

According to an aspect of the present disclosure, the Fenton apparatus 100 may be used to perform chemical processes, such as delignification of lignocellulosic materials to extract α-cellulose, synthesis of microcrystalline cellulose (MCC), nanocrystalline cellulose (NCC), and cellulose nanofibrils (CNF). The double-walled stainless steel body of the reactor vessel 102 functions as an electron donor synergizing the Fenton reagents, particularly in delignification of lignocellulosic materials and synthesis of the MCC.

Figure 4:
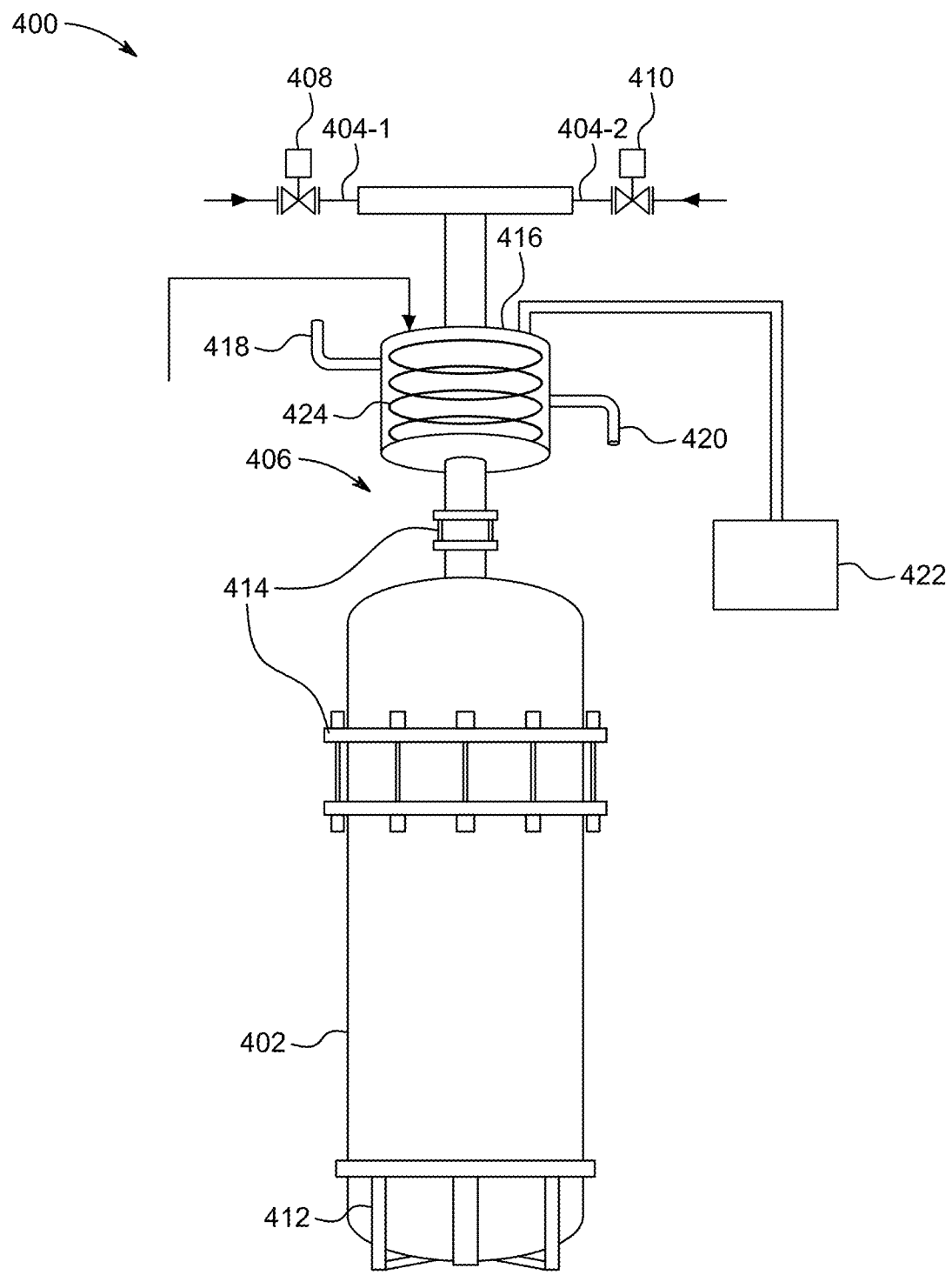
FIG. 4 illustrates another mixed Fenton apparatus to test a Fenton reaction, according to an embodiment of the present disclosure.

FIG. 4 illustrates another mixed Fenton apparatus 400 (referred to as "the Fenton apparatus 400"), according to exemplary aspects of the present disclosure. In an embodiment, the Fenton apparatus 400 includes a reactor vessel 402 made of glass, e.g., Corning (Pyrex) glass, and gas injection inlets 404 located at a top portion 406 of the reactor vessel 402 to inject at least one aeration coolant into the reactor vessel 402. Further, the Fenton apparatus 400 overcomes the use of the jacket cooling loop 122 and the coil cooling loop 302 described with respect to the FIG. 1 to FIG. 3 and thus these components may be excluded from this embodiment of the invention. In an embodiment, the at least one aeration coolant includes compressed air and carbon dioxide gas. Specifically, a first gas injection inlet 404-1 is coupled to a first solenoid 408 to inject compressed gas and a second gas injection inlet 404-2 is coupled to a second solenoid 410 to inject carbon dioxide gas.

In an embodiment, the reactor vessel 402 may be mounted on a stand 412 and secured by a support member 414. A condenser 416 may be disposed at the top portion 406 of the reactor vessel 402 and may include an inlet 418 and an outlet 420. The inlet 418 may be coupled to the reactor vessel 402 to collect vapors produced therein as a product of chemical reaction between product precursors and Fenton reagent, and the outlet 420 may be coupled to a collection vessel 422, for example a flask, to collect condensed vapors. The condenser 416 may further include a coolant channel 424 to allow flow of a coolant, such as cold water, to cool the vapors received into the condenser 416.

Experiment 1

In an experiment, the Fenton apparatus 400 was used in delignification of cardboard to produce α-cellulose and subsequent synthesis of microcrystalline cellulose (MCC) from cardboard pulp.

For the purpose of preparing cardboard pulp, cardboard was shredded into small strips using a mechanical tool (not shown) and the shredded strips were immersed in hot distilled water to allow swelling of cellulosic fibers and dissolving gums. Subsequently, the strips were blended using ultra-speed homogenizer, such as Robot-Coupe MP 450 ultra stick blender, until a jelly-like texture was formed. Fibers obtained post the blending were subjected to washing using distilled water to at least remove additives and fillers that were added during the aforementioned process. Fiber solution thus obtained was filtered to remove water and was subsequently subjected to natural drying followed by drying in an oven. The oven was maintained at 100° C.

Further, the dried cardboard fibers were introduced into the reactor vessel 402 which contains the Fenton reagent (mixture of hydrogen peroxide, ferric sulphate, and citric acid). Exothermic heat generated from the Fenton reagent was sufficient to increase the temperature of the contents in the reactor vessel 402. In addition, an oxidation property of the Fenton reagent allows delignification of the cardboard fibers, thereby producing α-cellulose. According to aspects of the present disclosure, the α-cellulose may be extracted from the reactor vessel 402 and may be used in various commercial processes, such as, but is not limited to, manufacture of paper, manufacture of regenerated cellulose used in textile and cellophane production. According to aspects of the present disclosure, the α-cellulose may be retained in the reactor vessel 402 for additional duration and thereafter be subjected to chemical hydrolysis to produce the microcrystalline cellulose (MCC).

Comparisons between the α-cellulose produced using the Fenton apparatus 100 and that synthesized in the Fenton apparatus 400 revealed that the products had maintained qualitative and quantitative properties for the α-cellulose and the microcrystalline cellulose (MCC). Based on the chemical and physical properties of the α-cellulose and the microcrystalline cellulose (MCC), the Fenton apparatus 100 and 400, along with the Fenton reagent, used in the present invention were found suitable for obtaining the α-cellulose and the microcrystalline cellulose (MCC).

Further, batch experiments were conducted to determine that citric acid achieved over 95% efficiency in the process of delignification and synthesis of the MCC. In addition, the presence of iron catalyst either from ferrous sulphate or Fe-metal catalyst was essential for effective decontamination. Batch tests with citric acid showed no signs of pressure accumulation. However, it was determined that an excessive usage of the hydrogen peroxide relative to iron catalysts resulted in lowering the efficiency of the delignification and the synthesis of MCC by iron chelation in the citric acid.

Figure 5A:
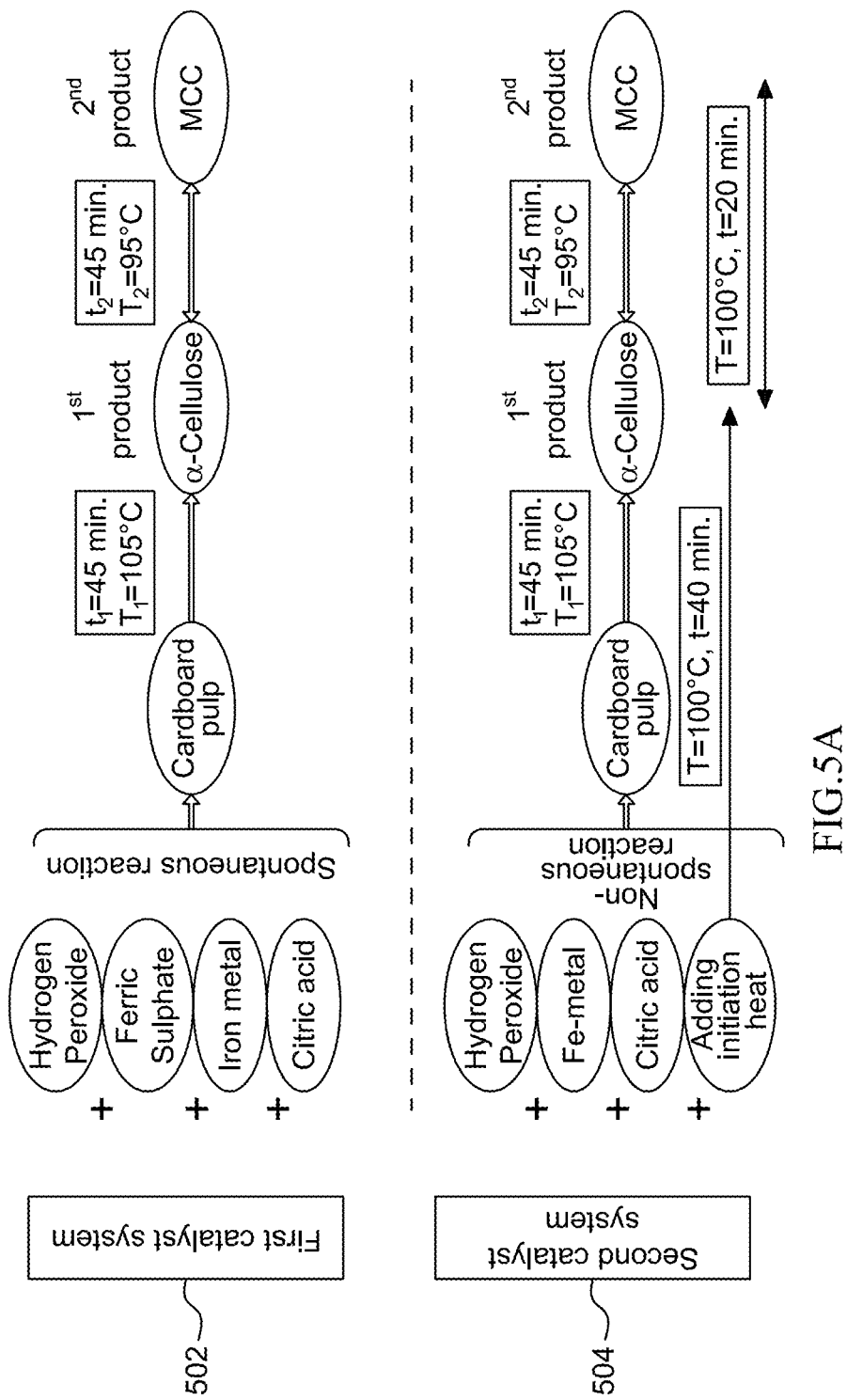
FIGS. 5A-5B illustrates various concentrations of Fenton reagents used as the exothermic heat generator in the mixed Fenton apparatus, according to an embodiment of the present disclosure.
Figure 5B:
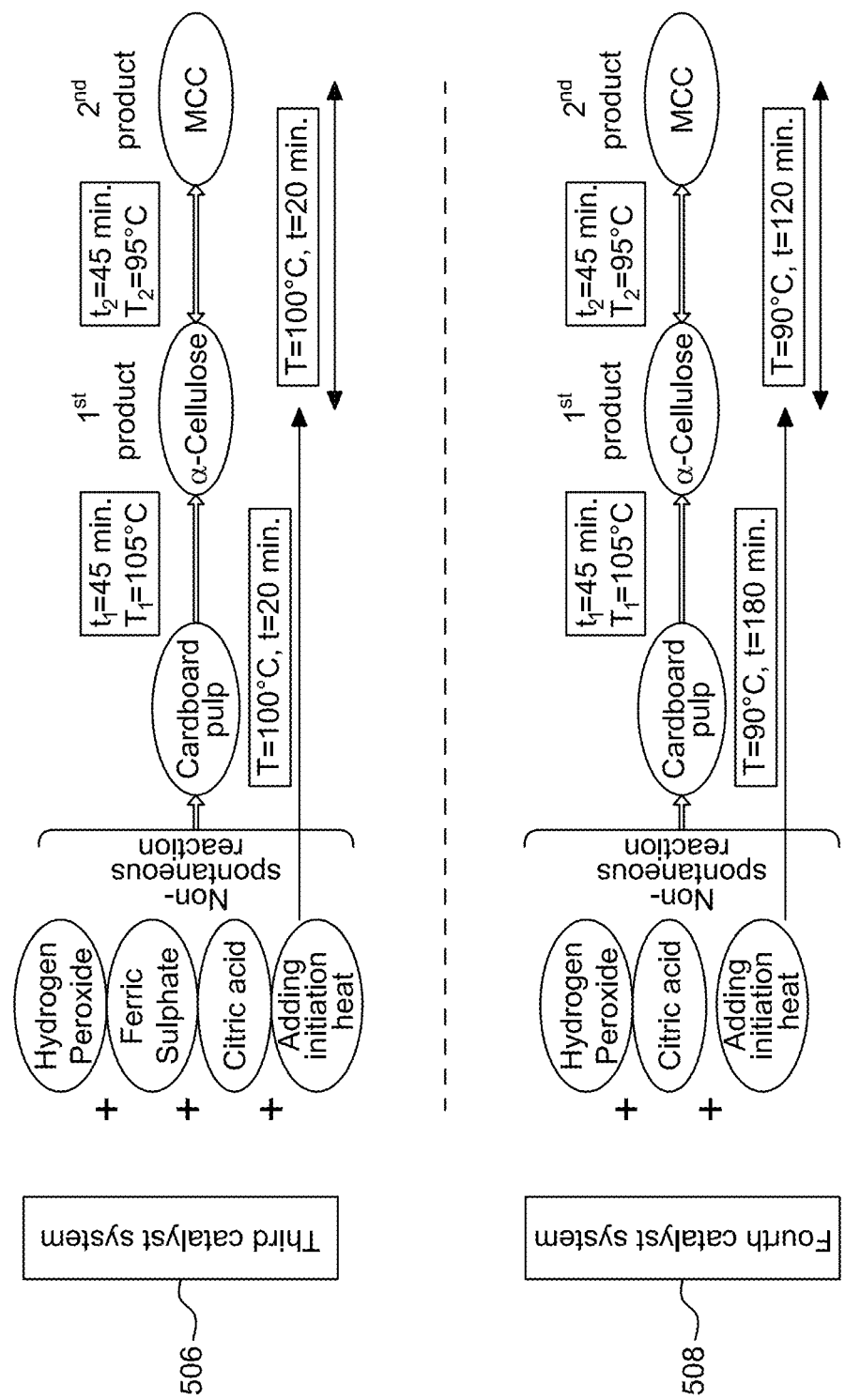

FIG. 5 illustrates various concentrations of Fenton reagents used as the exothermic heat generator for the delignification of cardboard into α-cellulose and subsequently into the MCC. Specifically, FIG. 5 shows four catalyst systems containing both hydrogen peroxide and citric acid as common components, which functions as oxidizing systems, to eliminate lignin, extractives, hemicelluloses, gums, and pigments upon delignification to produce α-cellulose as well as destroying amorphous regions of cellulosic microfibrils of α-cellulose found in crude cardboard fibers upon the synthesis of MCC.

The first catalyst system 502 includes two different types of iron-catalysts, namely iron salt (ferrous sulphate) and iron metal (iron atoms of the stainless steel material of the reactor vessel 102), that function as electron donors. Experiments indicated that the iron metal atoms had a synergistic effect to the iron salt whereby the reaction was faster in the reactor vessel 102 as compared to the reactor vessel 402. Accordingly, the reactions based on the first catalyst system 502 achieved a spontaneous reaction without need of addition of external heat.

The second catalyst system 504 includes iron metal (material of the reactor vessel 102) besides hydrogen peroxide and citric acid. Experiments indicated that the reaction in the reactor vessel 102 was non-spontaneous and required addition of external heat.

The third catalyst system 506 includes ferric sulphate besides hydrogen peroxide and citric acid. Experiments indicated that the reaction in the reactor vessel 102 was non-spontaneous reaction and required addition of external heat, where an amount of heat added was less than that of the second catalyst system 504.

The fourth catalyst system 508 includes only to hydrogen peroxide and citric acid. Experiments indicated that the reaction in the reactor vessel 402 was a non-spontaneous reaction and required addition of external heat, where an amount of heat added was greater than that of the second catalyst system 504 and the third catalyst system 506.

FIGS. 6A-6D illustrates scanning electron microscope (SEM) micrographs of cardboard fibers obtained from reaction in the Fenton apparatus 402. According to an aspect of the present disclosure, SEM characterization was applied for the cardboard pulp, the α-cellulose, and the synthesized MCC.

Figure 6A:
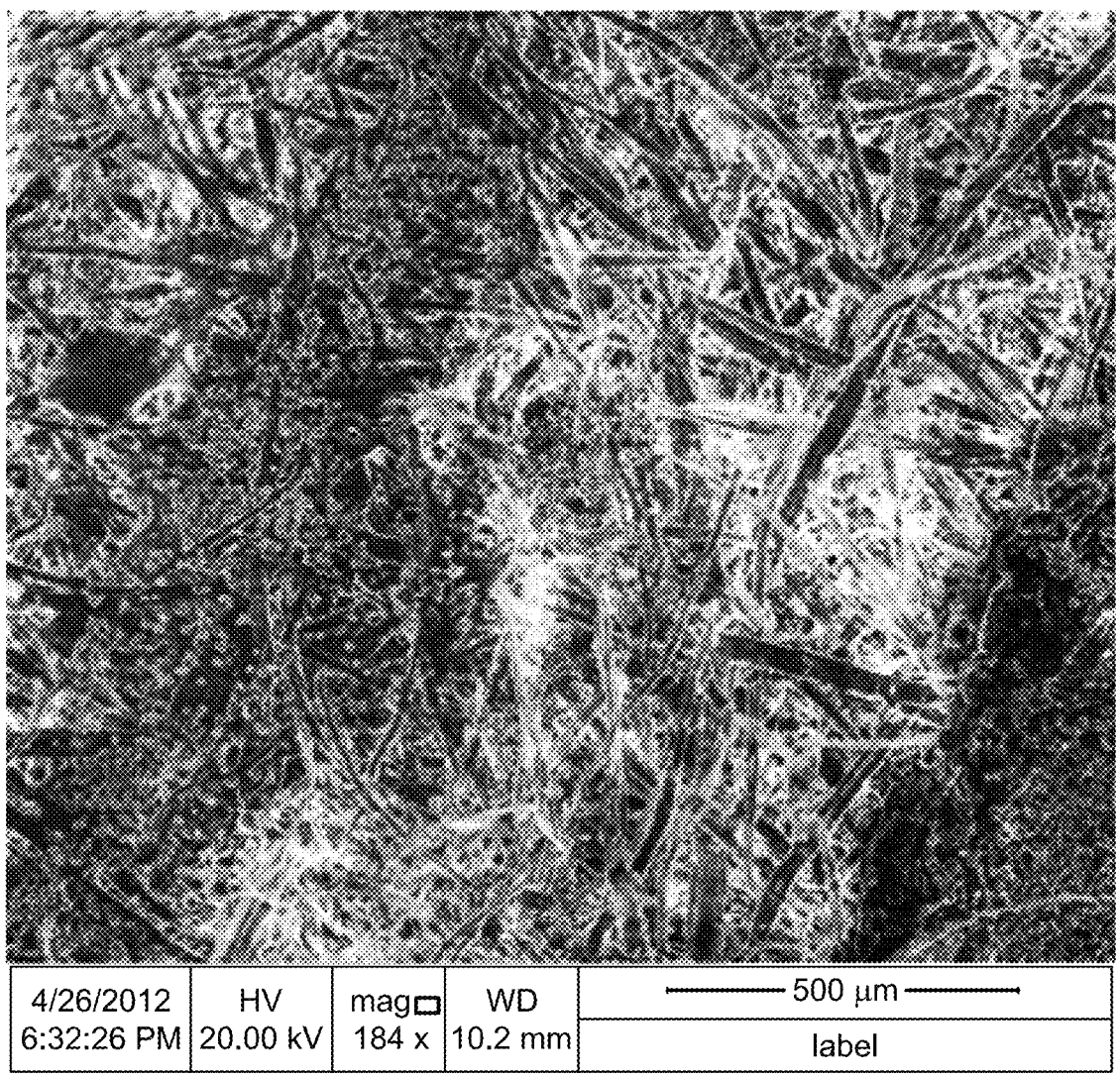
FIGS. 6A-6D shows scanning electron microscope (SEM) micrographs of cardboard fibers obtained from reaction in the mixed Fenton apparatus of FIG. 4, according to an embodiment of the present disclosure.
Figure 6B:
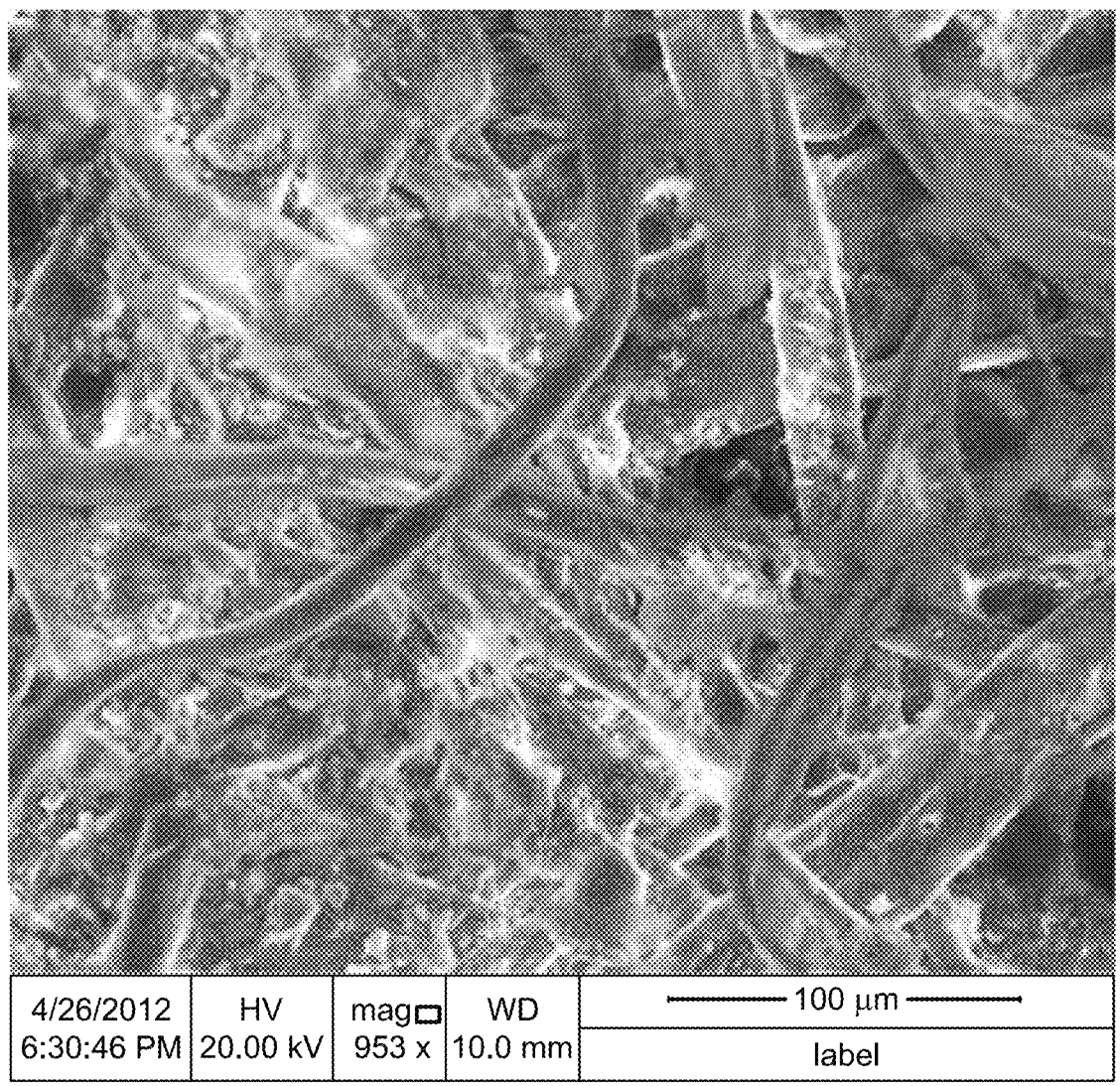
Figure 6C:
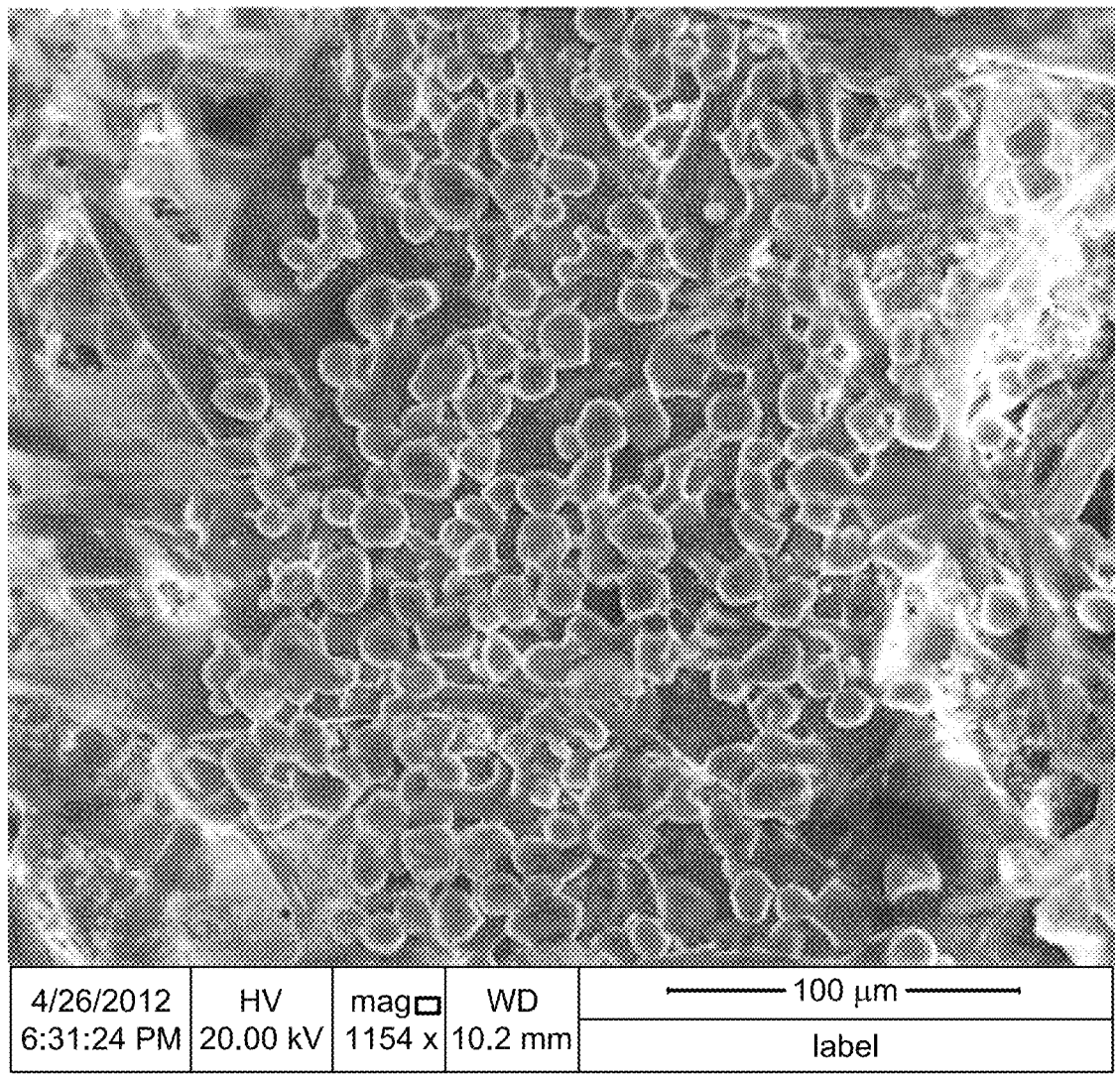
Figure 6D:
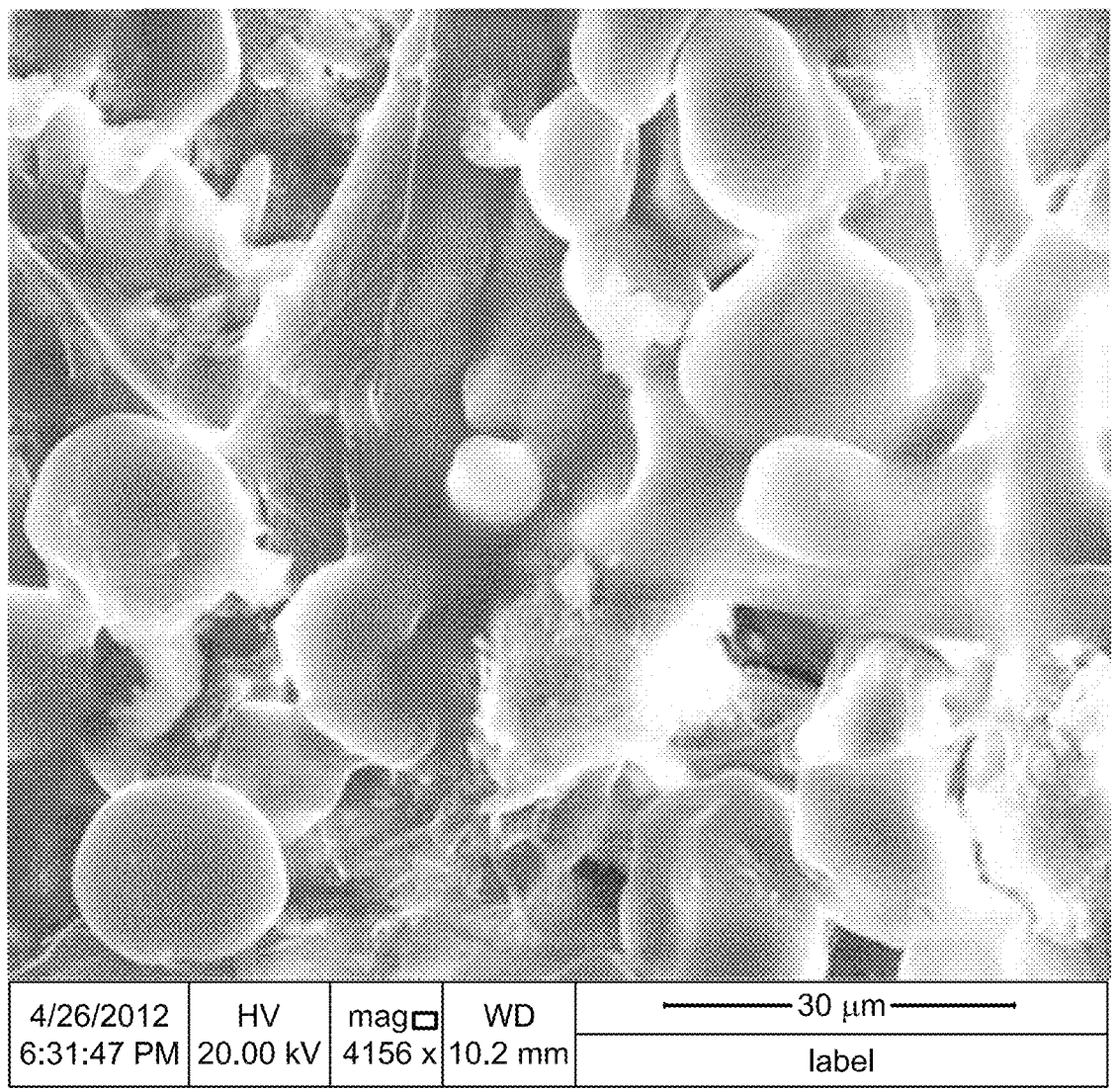

As can be seen from FIG. 6A, fusiform-shaped prosenchyma cells of the crude cardboard are clear in in a magnification power of 184×. Industrially, these cells are representative of more than one kind of tree species that varies in their length and width as shown in FIG. 6B magnified by 953×. FIG. 6C, magnified by 11 shows small spherical particles representing additives, for example gums, added to enhance mechanical properties of the cardboard. FIG. 6D shows the fibers further magnified at 4156×.

Figure 7A:
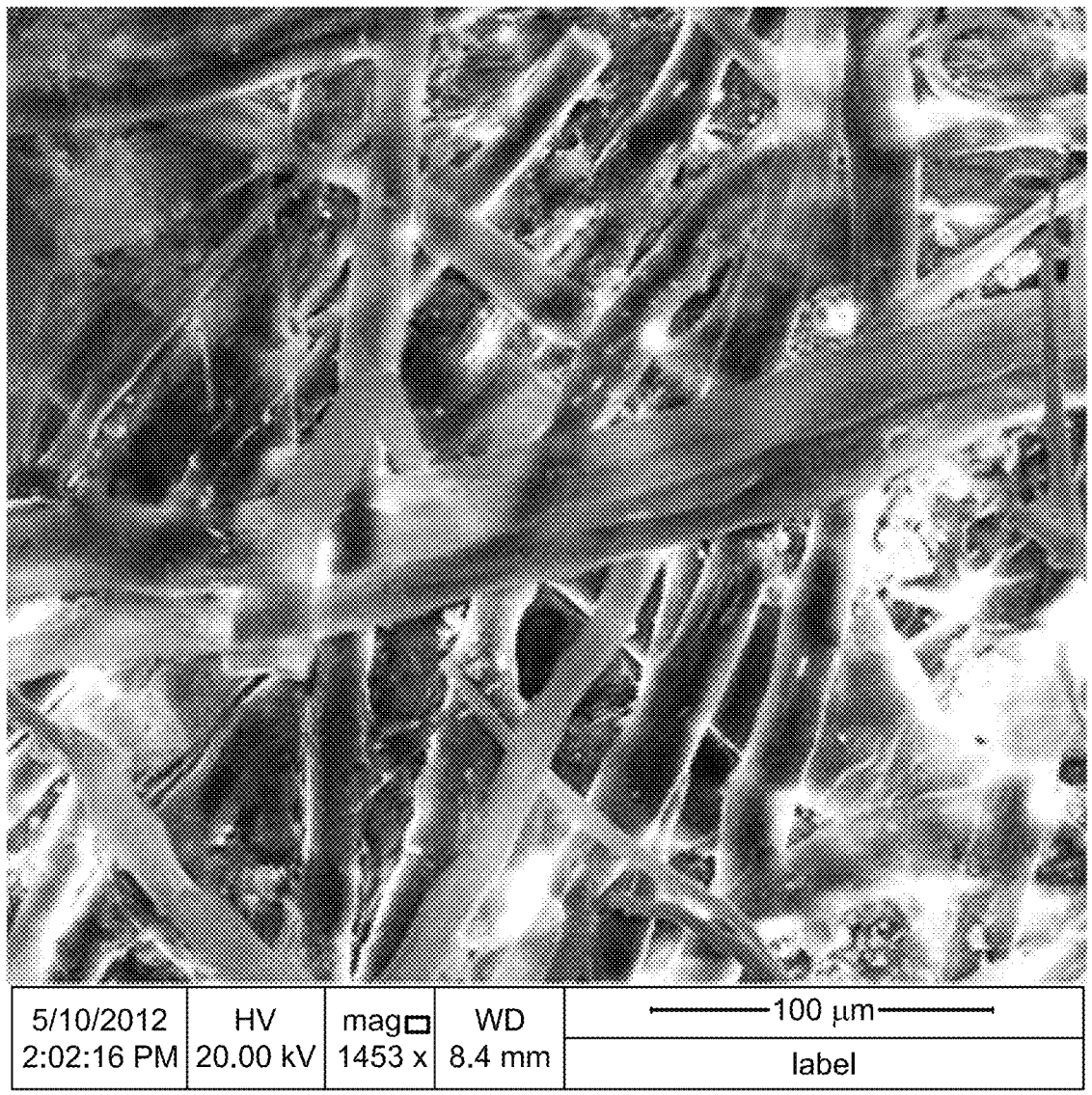
FIGS. 7A-7B shows SEM micrographs of α-cellulose obtained from the cardboard fibers, according to an embodiment of the present disclosure.
Figure 7B:
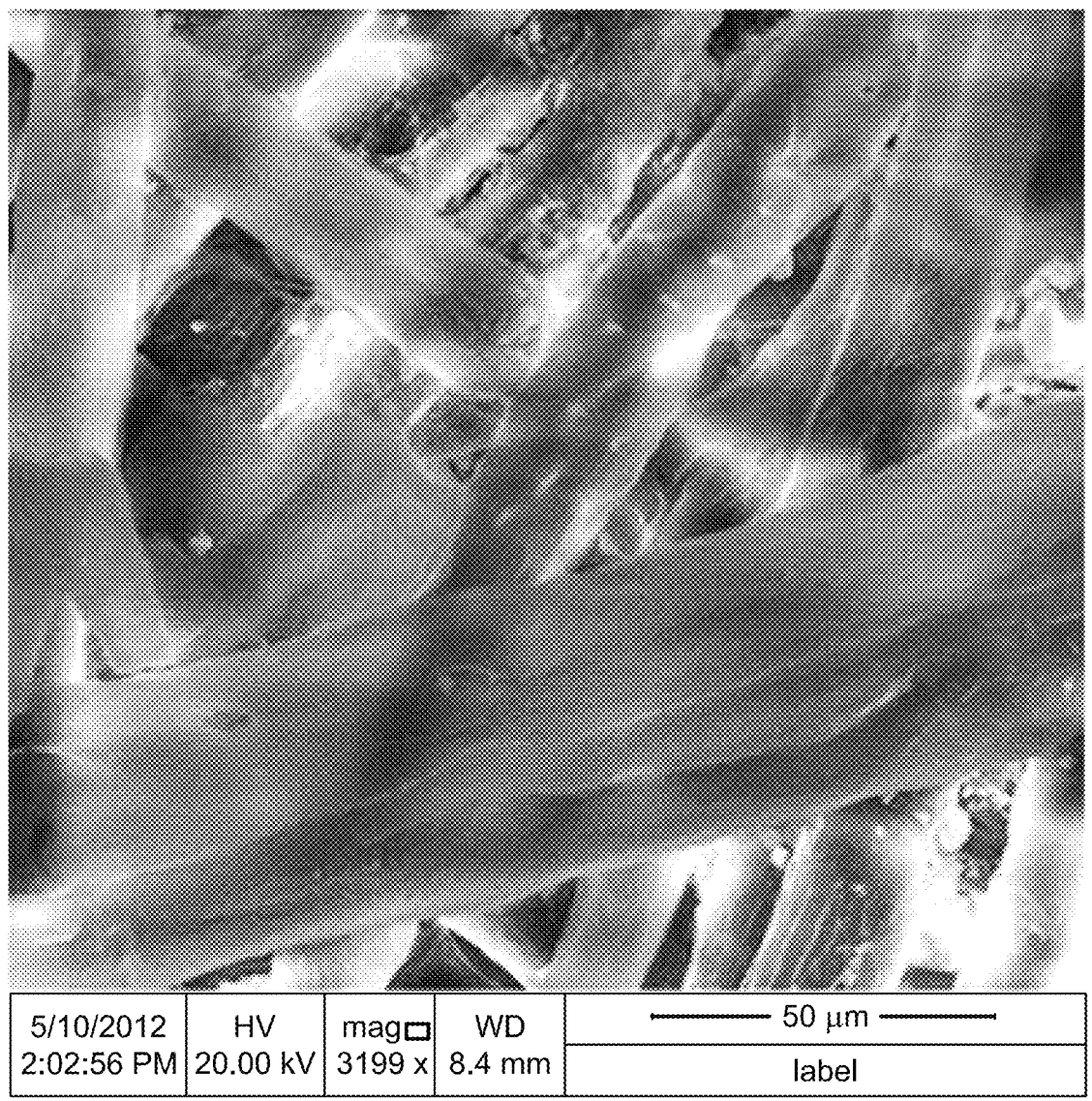

FIGS. 7A-7B illustrates SEM micrographs of the α-cellulose. Upon mixing the Fenton reagent with the cardboard pulp precursor according to the Fenton apparatus 402 described earlier, exothermal energy released from the Fenton reagent affected contaminants of the cardboard pulp, especially gums. Accordingly, the SEM micrographs of the cellulosic fibers appear to be free from the gum particles as shown in FIG. 7A magnified by 1453× and in FIG. 7B magnified by 3199×.

Figure 8:
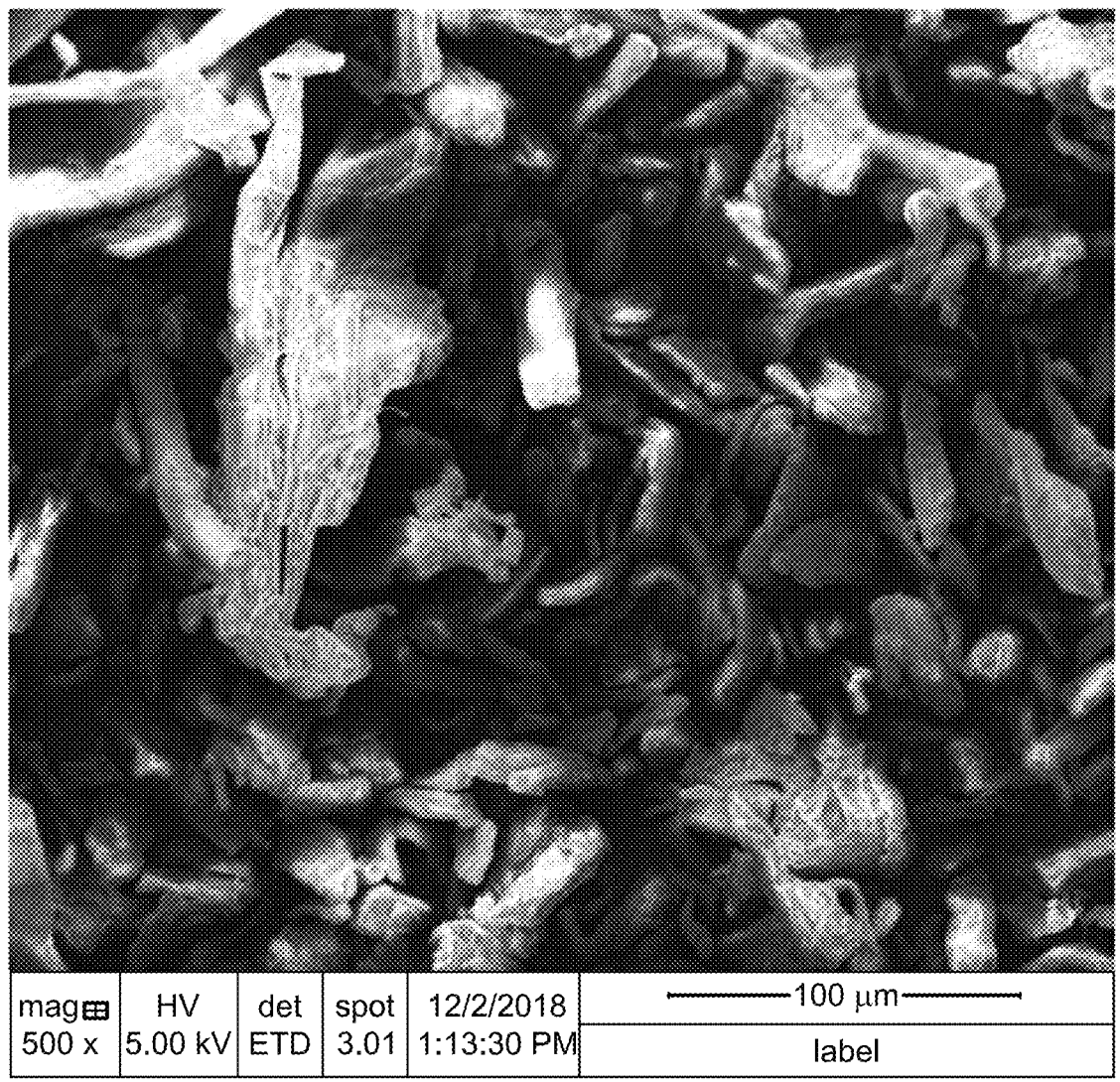
FIG. 8 shows SEM micrographs of microcrystalline cellulose obtained directly from the α-cellulose by using the Fenton reagent, according to an embodiment of the present disclosure.

FIG. 8 illustrates SEM micrographs of the MCC obtained directly from the α-cellulose by using the Fenton reagent. Specifically, morphology of isolated MCC is shown in FIG. 8 magnified by 500×. As seen in FIG. 8, all MCC particles are in the form of bundles in addition to the presence of various cross-interlocking points/junctions. A small length and diameter of MCC having rougher surface is also seen indicating higher efficiency of the present disclosure in removal of lignin, hemicellulose, and other impurities during the delignification process. Furthermore, it can be further visualized that the MCC shows individualized fibers having rod like structure that can be attributed to the oxidation reaction where the product precursor is dissolved into well separated fibrous strands.

The cellulosic fibers resulted from the cardboard precursor shows a smooth and clear surface that can be attributed to the partial removal of hemicellulose and lignin. When compared with cellulosic fibers illustrated in FIG. 7, the MCC exhibited non-uniform morphology of micro-sized fibrils having rougher surface. This appearance may be attributed to structural disintegration of fibrous strands into smaller size micro-crystallites during exposure to the oxidant of the Fenton reagent, which hydrolytically cleaves glycosidic bonds of cellulose.

Figure 9:
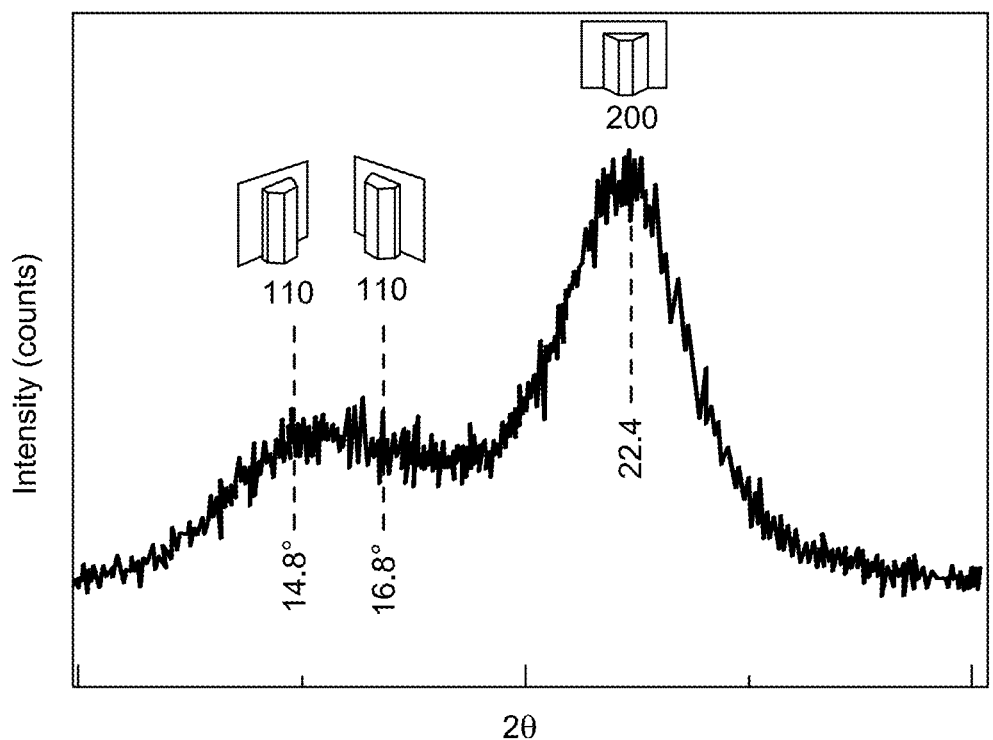
FIG. 9 illustrates X-Ray diffraction (XRD) of the α-cellulose obtained directly from the cardboard precursor by using the Fenton reagent, according to an embodiment of the present disclosure.
Figure 10:
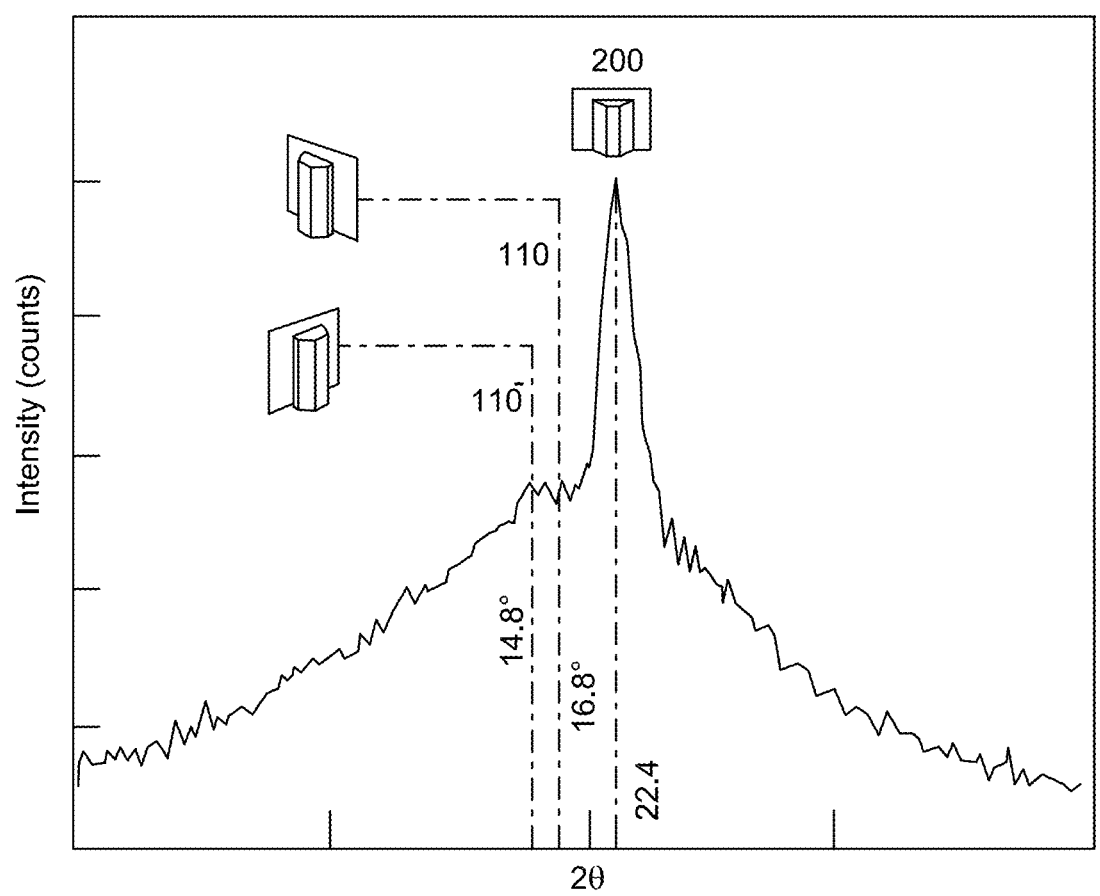
FIG. 10 illustrates X-Ray diffraction (XRD) of the microcrystalline cellulose (MCC) obtained directly from the α-cellulose by using the Fenton reagent, according to an embodiment of the present disclosure.

FIG. 9 illustrates X-Ray diffraction (XRD) of the α-cellulose obtained directly from the cardboard precursor by using the Fenton reagent and FIG. 10 illustrates X-Ray diffraction (XRD) of the microcrystalline cellulose (MCC) obtained directly from the α-cellulose by using the Fenton reagent. As can be noticed from FIG. 9 and FIG. 10, a distinct peak at 2θ=22.4° corresponds to the 200-lattice planes. In the 2θ range between 10° and 17°, there are two peaks of 110-lattice planes located at 14.8° and 16.8°, respectively. The main characteristic peaks of the α-cellulose and the MCC are found to be similar to that known for cellulose, indicating that the original crystalline structure of the cellulose found in the cardboard precursor is maintained after the subsequent oxidation by the Fenton reagent system to produce the α-cellulose as well as the MCC obtained through subsequent hydrolysis to destroy amorphous regions of the α-cellulose. Therefore, neither the Fenton apparatus 102, 402 of the present disclosure nor the Fenton reagent altered the parent structure of cellulosic precursor through either the delignification process or the hydrolysis process.

Further, as can be seen from Table-1 below, crystallinity index (CI) value is slightly increased from 70.05% for α-cellulose to 78.16% for the MCC. Such increase in the CI may be attributed to degrading a small fraction of disordered regions or hemicellulose of the α-cellulose at the higher oxidation level and are removed as water-soluble fractions. In addition, each of crystallite size (CS) and lattice spacing (LS) values were decreased when the α-cellulose was hydrolyzed into the MCC owing to the oxidation effect of the Fenton reagent that destroyed the amorphous regions of the microfibrils within fibers' cell walls and the subsequent increase in the crystallinity of the samples. Values indicated within parenthesis in Tables 1 and 2 below are standard deviations.

TABLE 1

| Cellulosic product | Yield % | Crystallinity index (CI), % | Crystallite Size (CS), nm | Lattice Spacing (LS), % |
|---|---|---|---|---|
| α-cellulose | 58.4 | 70.05 | 4.69 | 3.65 |
| | Standard deviation of 1.94 | Standard deviation of 1.07 | Standard deviation of 0.16 | Standard deviation of 0.14 |
| MCC | 81.06 | 78.16 | 4.17 | 2.46 |
| | Standard deviation of 1.63 | Standard deviation of 1.13 | Standard deviation of 0.18 | Standard deviation of 0.09 |

Furthermore, two different concentrations of the Fenton reagent were used in an experiment performed in the reactor vessel 102 and 402 are presented at Table 2, where the concentrations are abbreviated as 35/10/40 and 20/5/40 in the table below. In the experiment, a first concentration may contain 35% wt/wt of hydrogen peroxide, 10% wt/wt of ferric sulphate, and 40% wt/wt of citric acid. Similarly, a second concentration contained 20% wt/wt of hydrogen peroxide, 5% wt/wt of FeSO4, and 40% wt/wt of citric acid. All dilutions were made using sterilized deionized water. A solution of ferrous sulfate was added into the cellulosic solution that is needed to be oxidized in the reactor vessel 102 or 402. Subsequently, hydrogen peroxide was slowly added to the solution followed by slow addition of citric acid (40%, wt/wt) until the pH of the solution was about 3, where the reaction conditions were optimized. Thereafter, the Fenton reagent thus prepared was poured on α-cellulose extracted from recycled writing papers in a liquid to solid ratio of 5:1, thereby maintaining about 20% wt/wt concentration of the α-cellulose in the final solution.

TABLE 2

| Concentration | Abbreviation | Hydrogen peroxide (%) | Ferric sulphate (%) | Citric acid (%) | cardboard/liquor ratio (%) |
|---|---|---|---|---|---|
| C1 | 35/10/40 | 35 | 10 | 40 | 20 |
| C2 | 20/5/40 | 20 | 5 | 40 | 20 |

Figure 11:
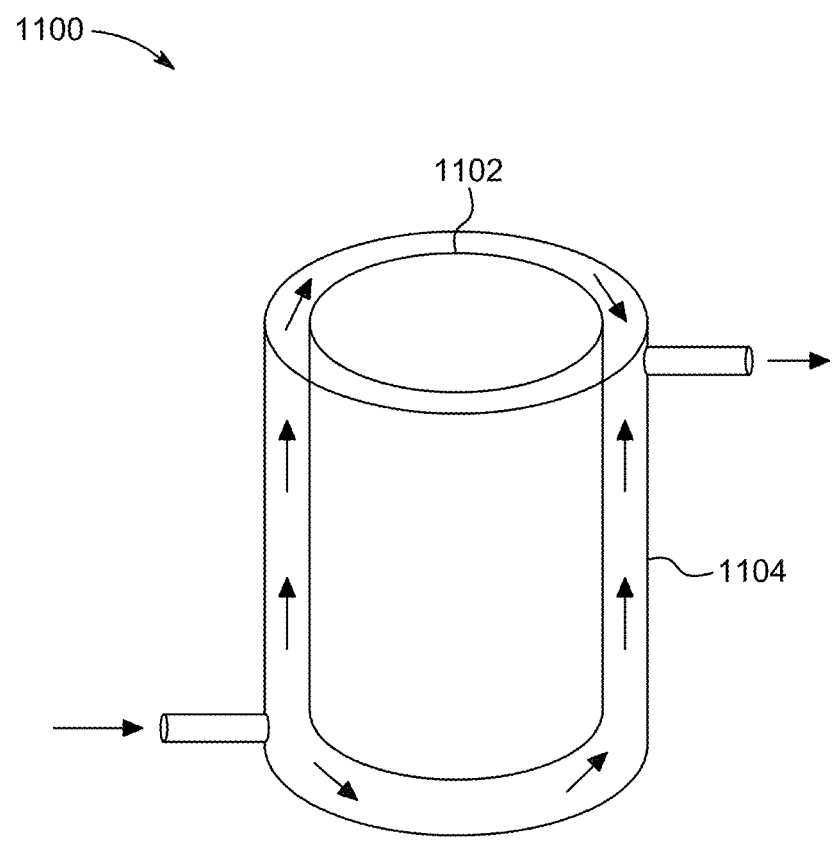
FIG. 11 illustrates an individual Fenton apparatus, according to an embodiment of the present disclosure.

FIG. 11 illustrates an individual Fenton apparatus 1100 (referred to as the Fenton apparatus 1100). In an embodiment, the Fenton apparatus 1100 includes a reactor vessel 1102 and a jacket cooling loop 1104 encasing the reactor vessel 1102 to allow flow of an exothermic fluid, such as the Fenton reagent, therethrough. According to an aspect of the present disclosure, the Fenton reagent may be circulated under pressure through the jacket 1104 when the product precursor is disposed in the reactor vessel 1102. In an example, the reactor vessel 1102 may be manufactured from stainless steel. As such, exothermal energy generated by the Fenton reagent may be transmitted to the product precursor without contact with the contents of the reactor vessel 1102.

Figure 12:
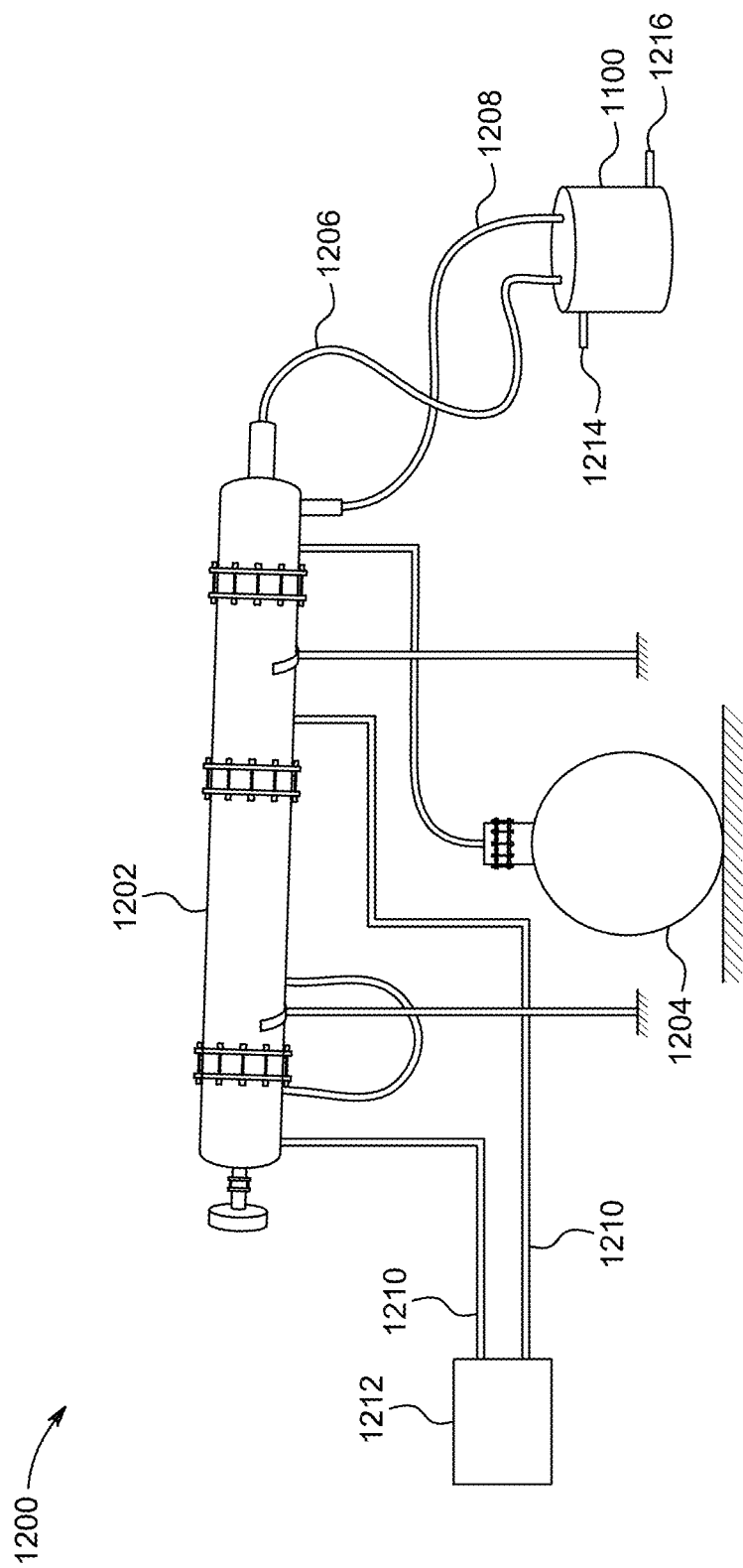
FIG. 12 illustrates a test environment implementing the individual Fenton apparatus, according to an embodiment of the present disclosure.

FIG. 12 illustrates a test environment 1200 implementing the Fenton apparatus 1100. The test environment 1200 includes an elongated condenser 1202 positioned in an inclined manner, a flask 1204 connected to the condenser 1202, a first outlet pipe 1206 extending between the condenser 1202 and the Fenton apparatus 1100, a second outlet pipe 1208 extending between the condenser 1202 and the Fenton apparatus 1100, and coolant pipes 1210 extending between a chiller unit 1212 and the condenser 1202. The chiller unit 1212 is configured to supply cold water to the condenser 1202. In some implementations, two or more reactor vessels may be located in series and each reactor vessel may be connected to the condenser 1202.

Experiment 2

Aromatic leaves, such as eucalyptus leaves, and water are disposed in the reactor vessel 1102, and the Fenton reagent circulates in the jacket 1104 between an inlet 1214 and an outlet 1216 of the Fenton apparatus 1100. The exothermic energy from the Fenton reagent caused boiling of the water within the reactor vessel 1102. Water vapors carrying volatilized essential oil from the eucalyptus leaves was allowed to pass through the first outlet pipe 1206 and the second outlet pipe 1208 to reach the condenser 1202. Use of the two outlet pipes allowed minimizing internal pressure within the reactor vessel 1102. The vapors get condensed by the condenser 1202 and are collected in the flask 1204. Supply of cold water to the condenser 1202 to cool the vapors facilitates retaining the concentration of the products and their pH. The essential oil separates from the water, dehydrated over anhydrous sodium sulphate, and is stored at 4° C. Properties of the extracted eucalyptus essential oil substantially match with the physical properties data of typical essential oil. Therefore, the Fenton apparatus 1100 and the Fenton reagent used in the present disclosure facilitates extraction of the essential oil from aromatic leaves thereby reducing cost of such extraction, time, and human efforts.

INDUSTRIAL APPLICABILITY

The present disclosure provides an economical and efficient solution to address concerns related to controlling the energy and temperature of the exothermic reactions in the reactor vessel in a safe environment. The exothermic heat of the Fenton reagent may aid another reaction, such as the delignification of woody tissue, synthesis of microcrystalline cellulose or extraction of essential oils from medical and aromatic plants. Accordingly, requirement of heating coils that consume high electric energy may be overcome. Further, the construction of the Fenton apparatus 102, 402 allows to end the exothermic reaction after a desired time period to get a desired product. For instance, when treating recycled cardboard or woody tissue with Fenton reagent under predefined conditions, such as, for example, maximum temperature of 105° C. for 45 minutes, α-cellulose may be obtained. With continuous exothermic effect of the Fenton reagent, the microcrystalline cellulose (MCC) may be synthesized at a maximum temperature of 105° C. for 90 minutes starting from either the reaction initiation or 45 minutes from the point of completion of the delignification of the cardboard into α-cellulose.

Further, the Fenton apparatus eliminates requirements of mechanical agitation of contents of the reactor vessel 102, 402 and achieves even distribution of heat transfer by agitation through forced supply of aeration coolant. Owing to the presence of three individual cooling loops, the reactor vessel 102, 402 is safe when compared to conventional reactors. As a result, the reactor vessel 102, 402 allows controlling of working parameters, such as enthalpy of the reactants and internal pressure with the aid of the three individual cooling loops. Due to the different coolant options, such as air, carbon dioxide, nitrogen gas, and cold water, cooling process can be efficiently handled in a cost-effective manner. As described earlier, cellulosic products are produced in higher yields and with quality owing to control of the reaction conditions within the reactor vessel 102, 402.

The Fenton apparatus 100, 400 of the present disclosure can be implemented to perform other processes, for example, but not limited to, thermal distillation of fuels for the purposes of their separation and purification, neutralization reactions, thermite reactions, burning of natural gas, corrosion reaction like oxidation of metals, polymerization reactions, Haber's process for ammonia production, dilution of concentrated sulfuric acid, and dehydration of sugars upon contact with sulfuric acid.

Obviously, numerous modifications and variations of the present disclosure are possible in light of the above teachings. It is therefore to be understood that within the scope of the appended claims, the disclosure may be practiced otherwise than as specifically described herein.

The invention claimed is:
1. A mixed Fenton apparatus, comprising:
a stainless steel reactor vessel;
a cover plate configured to cover a top end of the stainless steel reactor vessel;
gas injection inlets centrally located within the reactor vessel and passing through the cover plate;
a jacket cooling loop encasing the reactor vessel;
a coil cooling loop coiling around the reactor vessel;
the gas injection inlets having a direction end that permits injection of gas perpendicular to the axis of the reactor vessel and tangential to the circumference of the reactor vessel to thereby agitate a reaction composition present in the reactor vessel under vortex conditions;
a temperature sensor positioned within the reactor vessel;
a plurality of programmable solenoid valves that individually control the injection of at least one aeration coolant, and circulation of each of at least one jacket coolant and at least one coil coolant; and a controller configured to communicate with the temperature sensor and each of the plurality of programmable solenoid valves, wherein the reactor vessel does not contain a mechanical agitator.

2. The mixed Fenton apparatus of claim 1, wherein the gas injection inlets comprising:
   a first solenoid valve coupled to a first end of a first pipe;
   a second solenoid valve coupled to a first end of a second pipe;
   a third solenoid valve coupled to a first end of a third pipe; and
   a fourth solenoid valve coupled to a first end of a fourth pipe.

3. The mixed Fenton apparatus of claim 2, wherein at least one aeration coolant selected from the group consisting of forced air, nitrogen gas, and carbon dioxide gas are injected through at least one of the first, second, third, or fourth pipes, respectively.

4. The mixed Fenton apparatus of claim 1, wherein the jacket cooling loop comprises:
   a first jacket cooling subloop;
   a second jacket cooling subloop; and
   a third jacket cooling subloop.

5. The mixed Fenton apparatus of claim 4, wherein at least one jacket coolant selected from the group consisting of forced air, nitrogen gas, and water are circulated through at least one of the first, second, or third jacket cooling subloops, respectively.

6. The mixed Fenton apparatus of claim 1, wherein the coil cooling loop comprises:
   a first coil cooling subloop;
   a second coil cooling subloop;
   a third coil cooling subloop; and
   a fourth coil cooling subloop.

7. The mixed Fenton apparatus of claim 6, wherein at least one coil coolant selected from the group consisting of forced air, nitrogen gas, water, and carbon dioxide gas are circulated through at least one of the first, second, or third coil cooling subloops, respectively.

8. The mixed Fenton apparatus of claim 1, wherein
   at least one aeration coolant selected from a group consisting of forced air, nitrogen gas, and carbon dioxide gas is injected through the gas injection inlets;
   at least one jacket coolant selected from a group consisting of forced air, nitrogen gas, and water circulates through the jacket cooling loop; and
   at least one coil coolant selected from a group consisting of forced air, nitrogen gas, water, and carbon dioxide gas circulates through the coil cooling loop.

9. The mixed Fenton apparatus of claim 1, wherein each gas injection inlet comprises an injection pipe having a ball and socket mechanism configured to independently adjust an injection direction of gas into the reactor vessel.

10. A mixed Fenton apparatus, comprising:
    a stainless steel reactor vessel;
    gas injection inlets centrally located within the reactor vessel;
    a jacket cooling loop encasing the reactor vessel;
    wherein the gas injection inlets having a direction end that is configured to inject gas perpendicular to the axis of the reactor vessel and tangential to the circumference of the reactor vessel and configured to permit circular flow of gas in a vortex in the reactor vessel;
    wherein the gas injection inlets are configured to inject at least one aeration coolant selected from a group consisting of forced air, nitrogen gas, and carbon dioxide gas into the reactor vessel; and
    an exothermic reaction fluid circulating through the jacket cooling loop,
    wherein the reactor vessel does not contain a mechanical agitator.

11. The mixed Fenton apparatus of claim 10, wherein the exothermic reaction fluid circulating through the jacket cooling loop is at least one of forced air, nitrogen gas, and water circulating through the jacket cooling loop.

12. The mixed Fenton apparatus of claim 10, further comprising:
    a coil cooling loop coiling around the reactor vessel; and
    at least one coil coolant selected from the group consisting of forced air, nitrogen gas, water, and carbon dioxide gas circulating through the coil cooling loop.

13. The mixed Fenton apparatus of claim 12, wherein a plurality of programmable solenoid valves that individually control the injection of the aeration coolant, and circulation of jacket, and coil coolants.

14. The mixed Fenton apparatus of claim 13, further comprising a controller configured to communicates with a temperature sensor and each of the plurality of programmable solenoid valves.

15. The mixed Fenton apparatus of claim 10, further comprising a temperature sensor positioned within the reactor vessel.

16. The mixed Fenton apparatus of claim 10, wherein the gas injection inlets comprising:
    a first solenoid valve coupled to a first end of a first pipe;
    a second solenoid valve coupled to a first end of a second pipe;
    a third solenoid valve coupled to a first end of a third pipe; and
    a fourth solenoid valve coupled to a first end of a fourth pipe.

17. The mixed Fenton apparatus of claim 16, wherein at least one aeration coolant selected from the group consisting of forced air, nitrogen gas, and carbon dioxide gas are injected through at least one of the first, second, third, or fourth pipes, respectively.

18. The mixed Fenton apparatus of claim 10, wherein the jacket cooling loop comprises:
    a first jacket cooling subloop;
    a second jacket cooling subloop; and
    a third jacket cooling subloop.

19. The mixed Fenton apparatus of claim 18, wherein at least one jacket coolant selected from the group consisting of forced air, nitrogen gas, and water are circulated through at least one of the first, second, or third jacket cooling subloops, respectively.

20. The mixed Fenton apparatus of claim 10, wherein each gas injection inlet comprises an injection pipe having a ball and socket mechanism configured to independently adjust an injection direction of gas into the reactor vessel.

* * * * *